G. AJELLO.
LANDING GEAR AND SHOCK ABSORBER FOR AIRCRAFT.
APPLICATION FILED AUG. 27, 1918.
1,376,912.  Patented May 3, 1921.
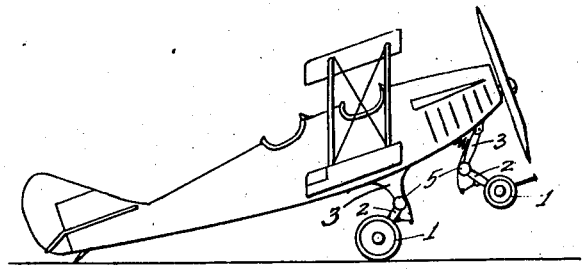
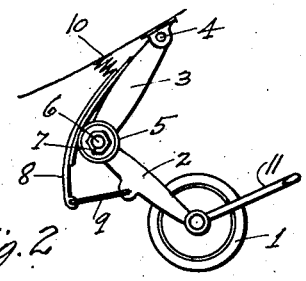
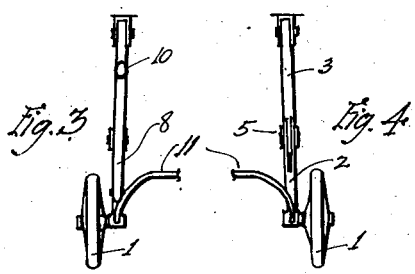
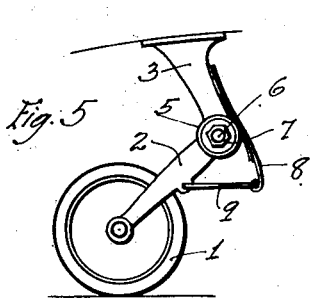
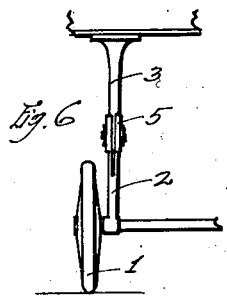
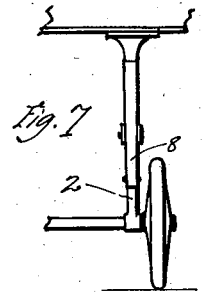
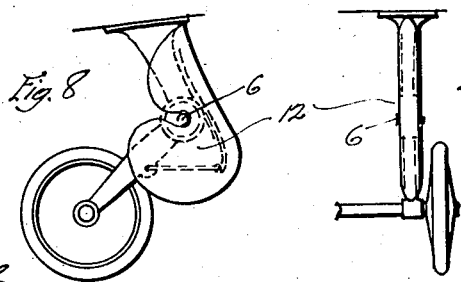
WITNESSES:  
INVENTOR.

UNITED STATES PATENT OFFICE.

GAETAN AJELLO, OF NEW YORK, N. Y.

LANDING-GEAR AND SHOCK-ABSORBER FOR AIRCRAFT.

1,376,912.  Specification of Letters Patent.  Patented May 3, 1921.

Application filed August 27, 1918. Serial No. 251,617.

*To all whom it may concern:*

Be it known that I, GAETAN AJELLO, a citizen of the United States, residing at New York, in the county of New York and State of New York, have invented certain new and useful Improvements in Landing-Gears and Shock-Absorbers for Aircraft, of which the following is a specification.

The object of the invention is to provide a very resilient landing gear which will also act simultaneously as a shock absorber, and as a front bumper.

With such objects in view, inspired by the action and appearance of the legs of birds and flying insects, I provide two arms and a wheel at each gear. Such arms being angularly disposed to each other, form a knee at their junction and receive the shocks accordingly. I also provide a similar gear at the front of the aircraft with an extension or appendix acting as a front bumper to protect the propeller. I also provide a means of covering the above mentioned gears so to oppose the least resistance to the flow of air while the aircraft flies.

Referring to the accompanying sheet of drawings, forming part of this specification, Figure 1 is a side elevation of an aircraft with a landing gear attached to its front forming also a bumper, and a main principal gear more centrally disposed or attached. Fig. 2 is a side elevation in large scale of the front gear with the bumper attachment, Figs. 3 and 4 are respectively its rear and front view. Fig. 5 is a side elevation of the posterior or main gear, with Figs. 6 and 7 showing respectively its rear and front view. Both Figs. 3 and 4 and below, Fig. 6 and Fig. 7, are shown in a way to illustrate also the approximate distance between wheels. Fig. 8 is a side elevation of the landing gear wrapped or covered with a thin material, and Fig. 9 its front view.

Referring by numerals to the drawings, 1 represents the wheel which by the landing of the aircraft transmits the shock to a lower arm 2 which is connected to an upper arm 3 rigidly fastened to the aircraft as in the case of the posterior landing gear, or pivotally fastened as in the case of the front gear by bolt 4.

A knee 5 is formed by the ends of the two arms 2 and 3 frictionally jointed by bolt 6 and adjusting nut 7. Arm 3 works between the two members of arm 2 and can easily move up and down. The double outer line of knee 5 represents a flanged cover carried by arm 3 and each side forming cuplike spaces, in which are placed the friction plates which are self lubricating and highly resisting to wear. It is obvious that these friction plates form the shock absorber of the gear. Any up and down movement of arm 2 is controlled by the action of a steel leaf spring 8, through a connecting bar or rod 9. The spring is attached to arm 3 and has the knee 5 with its roundness as a very convenient fulcrum. In the front landing gear more clearly illustrated in Fig. 2 a spring 10 is placed between the aircraft and arm 3 directly over spring 8.

The front bumper bar, whose action and connections are obvious, is represented by 11, while 12 denotes the covering with round ends or edges of the entire gear, easily attached or detached by means of bolt 6. Such wrapper or cover 12 could be made of transparent material.

Having thus described my invention, what I claim as new and desire to secure by Letters Patent is:

1. In a landing gear and shock absorber for aircraft, the combination of a pair of arms jointed together for relative movement, a wheel journaled upon one of the arms, resilient means acting upon the arms tending to prevent the flexing thereof at the joint and to restore the arms to normal extended position after being flexed, and friction disk means secured to the joint serving as a resistance against the too rapid relative movement of the arms.

2. In a landing gear and shock absorber for aircraft, the combination of a pair of arms, a knee joint connecting the arms so that one of them will move around the joint with relation to the other, a ground member carried by the movable arm, spring means fixed to one of the arms and having articulated connection with the other arm and tending to straighten the arms around said knee joint, and a shock absorber applied to the joint serving as a retarding means for the flexing of the arms.

3. In a landing gear and shock absorber for aircraft, the combination with the body of the craft, of an arm attached to the body, a second arm having knee joint connection with the first arm, a shock absorber tending to resist the flexing of the arms at the joint, a ground member carried by the second mentioned arm, and a spring fixed to the first mentioned arm and having link connection with the second mentioned arm, the knee joint serving as a fulcrum for the spring in tending to restore the second mentioned arm and ground member to extended position after being flexed.

4. In a device of the class set forth, the combination with an aircraft body, an arm attached to the body, a second arm having jointed connection with the first mentioned arm, friction disk means associated with the joint tending to resist the flexing thereof, a ground member carried by the second arm, and spring means acting upon the arms tending to maintain them extended.

5. In a device of the class set forth, the combination with a rigid portion of the craft, of an arm attached thereto, a second arm, a knee joint connection between the arms permitting the same to flex with respect to each other, friction means associated with the joint and serving to retard the flexing action, spring means acting upon the arms tending to extend them around the joint, and a bumper carried by the device, substantially as and for the purpose set forth.

6. In a landing gear and shock absorber for aircraft, the combination with a body and a propeller therefor, of an arm attached to said body at the rear of the propeller, a second arm articulated to the first arm, a ground member carried by the second arm, means to control the flexing of the two arms with respect to each other, and a bumper carried by the second arm aforesaid and projecting forward to guard the propeller.

7. In a landing gear and shock absorber for aircraft, the combination with a rigid portion of the craft, of a plurality of arms attached to said rigid portion, another plurality of arms articulated to the first mentioned arms respectively and spaced laterally from one another, means coöperating with the arms articulated together serving to control the relative movement between them, and a bumper extending transversely between the pairs of arms and forward therefrom, substantially as set forth.

8. In a device of the class set forth, the combination with a rigid portion of an aircraft, of a plurality of arms pivoted thereto and spaced laterally from each other, spring means acting between the rigid portion aforesaid and the arms tending to extend the arms from the rigid portion, a second plurality of arms articulated to the first plurality respectively, spring means acting between the connected arms tending to extend them, a plurality of ground members carried by the second plurality of arms, and a bumper extending laterally from one ground member to the other and forward therefrom.

9. In a device of the class set forth, the combination with a rigid portion of the craft, of a plurality of arms pivoted at one end of said rigid portion, a spring acting between the rigid portions and said arms tending to project the arms away from the rigid portion, a second plurality of arms having knee joint connection respectively with the first mentioned arms, leaf spring means acting between the articulated arms tending to cause the second plurality to be extended with respect to the first, ground members carried by the second set of arms, and shock absorber means associated with the several knee joints aforesaid to retard the flexing action.

10. In a landing gear and shock absorber for aircraft, the combination with a rigid portion of the craft, of an arm pivoted at one end to said rigid portion, means to resiliently resist the movement of said arm toward the rigid portion, a second arm having knee joint articulation with the opposite end of the first mentioned arm, leaf spring means fixed to one of the arms and having link connection with the other arm and tending to extend the two arms with respect to each other, said leaf spring means acting over the knee joint as a fulcrum, and a ground member carried by the second mentioned arm at its end remote from the knee joint.

11. In a landing gear and shock absorber for aircraft, the combination of an arm, means to pivotally attach said arm to the craft, a spring acting upon the arm tending to force it away from the craft, a second arm, knee joint connection between the second arm and the knee of the first mentioned arm remote from its point of attachment with the rigid member, spring means acting between the two arms tending to extend them around the knee joint, disk friction means at the knee joint tending to retard the flexing action, a ground member carried by the second arm remote from the joint, and a bumper carried by the second arm and projecting forward with respect to the ground member.

GAETAN AJELLO.